(12) United States Patent
Inokuchi et al.

(10) Patent No.: US 9,434,819 B2
(45) Date of Patent: Sep. 6, 2016

(54) HYDROPHILIZED SILICONE PARTICLES AND MAKING METHOD

(71) Applicant: SHIN-ETSU CHEMICAL CO., LTD., Tokyo (JP)

(72) Inventors: Yoshinori Inokuchi, Annaka (JP); Mamoru Hagiwara, Tokyo (JP); Naoki Omura, Tokyo (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 14/649,035

(22) PCT Filed: Jan. 3, 2013

(86) PCT No.: PCT/IB2013/000309
§ 371 (c)(1),
(2) Date: Jun. 2, 2015

(87) PCT Pub. No.: WO2014/106768
PCT Pub. Date: Jul. 10, 2014

(65) Prior Publication Data
US 2015/0329678 A1 Nov. 19, 2015

(51) Int. Cl.
C08G 77/38 (2006.01)
C08J 7/18 (2006.01)
C08J 3/28 (2006.01)
C08G 77/04 (2006.01)
C08G 77/50 (2006.01)

(52) U.S. Cl.
CPC .......... C08G 77/38 (2013.01); C08J 3/28 (2013.01); C08J 7/18 (2013.01); C08G 77/04 (2013.01); C08G 77/50 (2013.01); C08J 2383/02 (2013.01); C08J 2383/04 (2013.01); Y10T 428/2995 (2015.01)

(58) Field of Classification Search
None
See application file for complete search history.

(56) References Cited

U.S. PATENT DOCUMENTS 4,729,978 A * 3/1988 Sawicki .............. B01J 27/1806
502/174
5,538,793 A 7/1996 Inokuchi et al.
5,725,962 A 3/1998 Bader et al.
6,280,749 B1 8/2001 Omura et al.
2006/0269710 A1 11/2006 Inglis

FOREIGN PATENT DOCUMENTS

| EP | 2216357 A1 | 8/2010 |
| JP | 40-16917 B | 8/1965 |
| JP | 63-77940 A | 4/1988 |
| JP | 4-88023 A | 3/1992 |
| JP | 6-635 A | 1/1994 |
| JP | 6-134296 A | 5/1994 |
| JP | 6-285365 A | 10/1994 |
| JP | 7-196815 A | 8/1995 |
| JP | 2010-275334 A | 12/2010 |
| WO | WO 2006/073662 A2 * | 7/2006 |

OTHER PUBLICATIONS

Abstract for CN 101982502 (Mar. 2011).*
Machine-generated translation of CN 101982502 into English.*
"Effects of Plasma Treatments on Ultralow-k Dielectric Film and Ta Barrier Properties in Cu Damascene Processing" authored by Kumar et al. and published in the Journal of the Electrochemical Society (2006) 153(5) G420-G427.*
Abbasi et al., "Modification of polysiloxane polymers for biomedical applications: a review", Polymer International, Dec. 1, 2001, vol. 50, No. 12, pp. 1279-1287.
Arpagaus et al., "A Downer Reactor for Short-time Plasma Surface Modification of Polymer Powders", Chemical Engineering and Technology, Weinheim, DE, Jan. 31, 2005, vol. 28, No. 1, pp. 87-94.
Bhattacharya et al., "Studies on Surface Wettability of Poly(Dimethyl) Siloxane (PDMS) and Glass Under Oxygen-Plasma Treatment and Correlation with Bond Strength", Journal of Microelectromechanical Systems, IEEE Service Center, US, Jun. 1, 2005, vol. 14, No. 3, pp. 590-597.
International Search Report, issued in PCT/IB2013/000309, dated Jun. 25, 2013.
Sonnefeld et al., "Application of Plasma Surface Treatment to Solid-State Microscopic Partoculates" Plasma Processes and Polymers, Mar. 20, 2009, vol. 6, No. 3, pp. 170-179.
Written Opinion of the International Searching Authority, issued in PCT/IB2013/000309, dated Jun. 25, 2013.

* cited by examiner

Primary Examiner — Marc Zimmer
(74) Attorney, Agent, or Firm — Birch, Stewart, Kolasch & Birch, LLP

(57) ABSTRACT

Surfaces of silicone particles are hydrophilized by plasma treatment. The hydrophilized silicone particles are readily dispersible in aqueous materials without a need for dispersants, typically surfactants. In aqueous cosmetic applications externally applied to the skin such as skin care cosmetics, make-up cosmetics, antiperspirant cosmetics, and UV care cosmetics, for example, products free of skin irritation concern can be formulated because formulation is possible without a need for surfactants.

9 Claims, No Drawings

HYDROPHILIZED SILICONE PARTICLES AND MAKING METHOD

TECHNICAL FIELD

This invention relates to silicone particles having hydrophilized surfaces and a method for preparing the same.

BACKGROUND ART

It is a common practice in the prior art to subject inorganic particles to plasma treatment to render their surfaces more hydrophilic and wettable, so that the particles may be readily dispersed in aqueous solvents or improved in dispersion in organic solvents and resins. JP-A H06-000635 (Patent Document 1) describes an exemplary method of hydrophilizing surfaces of alumina particles via atmospheric plasma treatment. JP-A H06-134296 (Patent Document 2) describes an exemplary method of hydrophilizing surfaces of titania or alumina particles via atmospheric plasma treatment. JP-A H06-285365 (Patent Document 3) describes an exemplary method of hydrophilizing surfaces of titania particles via atmospheric plasma treatment. JP-A 2010-275334 (Patent Document 4) discloses plasma treatment of silica particles to improve their dispersion in epoxy resins.

Meanwhile, silicone particles are used from the past in cosmetics for the purposes of imparting silky, smooth and pleasant feels on use, ease of spreading, and soft focus effect. The silicone, however, has the problem that it is so water repellent that it may be dispersed in aqueous cosmetic compositions with difficulty. The additional use of surfactants or the surface treatment of particles makes it possible to disperse silicone particles in water. However, since the surfactants are suspicious of skin irritation, it is sometimes avoided to use surfactants in those cosmetics applied externally to the skin such as skin care cosmetics, make-up cosmetics, antiperspirant cosmetics, and UV care cosmetics.

SUMMARY OF THE INVENTION

Problems to be Solved by the Invention

An object of the invention is to provide hydrophilized silicone particles which may be readily dispersed in aqueous materials without a need for dispersants, typically surfactants, and a method for preparing the hydrophilized silicone particles.

Means for Solving the Problems

The inventors have found that by plasma treating silicone particles to hydrophilize their surfaces, hydrophilic silicone particles are obtainable which may be readily dispersed in water without a need for dispersants, typically surfactants.

In one aspect, the invention provides silicone particles whose surface is hydrophilized by plasma treatment. The invention also provides a water dispersion of silicone particles wherein the surface of silicone particles is hydrophilized by plasma treatment, and the hydrophilized silicone particles are uniformly dispersed in water and turn hydrophobic by disappearing the hydrophilic nature when water is volatilized. In a preferred embodiment, hydrophobic silicone particles to be hydrophilized are polyorganosilsesquioxane particles or silicone rubber particles surface coated with polyorganosilsesquioxane. It is preferred to hydrophilize these particles by plasma treatment.

The plasma treatment for hydrophilizing surfaces of silicone particles is preferably by generating hydrophilic groups at particle surfaces, and specifically by creating a plasma with an oxygen atom-containing gas in vacuum, or by generating radicals from a plasma of rare gas atoms under atmospheric pressure and treating the radicals with water or water vapor. Alternatively, hydrophilic groups may be generated on silicone particle surfaces by plasma treatment in vacuum using a hydrocarbon-containing gas mixture, that is, plasma polymerization.

In another aspect, the invention provides a method for preparing hydrophilic silicone particles comprising the step of plasma treating surfaces of hydrophobic silicone particles. In one preferred embodiment, surfaces of hydrophobic silicone particles may be hydrophilized by subjecting them to low-pressure oxygen plasma treatment in a vacuum chamber using an oxygen-containing gas selected from among oxygen, water vapor and hydrogen peroxide or a gas mixture of the oxygen-containing gas and a rare gas. More preferably, the hydrophobic silicone particles are fed into the chamber, the chamber is pumped to a pressure equal to or less than 5 Pa, the oxygen-containing gas or a gas mixture of the oxygen-containing gas and a rare gas is fed into the chamber, and low-pressure oxygen plasma treatment is effected under a pressure of 30 to 100 Pa.

In another preferred embodiment, surfaces of hydrophobic silicone particles are hydrophilized by subjecting them to atmospheric plasma treatment using a rare gas or a gas mixture of the rare gas and an oxygen-containing gas selected from among oxygen, water vapor and hydrogen peroxide.

In a further preferred embodiment, surfaces of hydrophobic silicone particles are hydrophilized by subjecting them to plasma polymerization treatment using a hydrocarbon gas, an oxygen-containing gas and optionally, a rare gas. More preferably, the hydrophobic silicone particles are fed into a plasma polymerization reactor, the reactor is pumped to a pressure equal to or less than 0.5 Pa, a hydrocarbon gas, an oxygen-containing gas and optionally, a rare gas are fed into the reactor, and plasma polymerization treatment is effected under a pressure of 3 to 10 Pa.

It is noted that the silicone particles plasma treated as above are preferably admitted to and dispersed in water directly or after exposure to a water vapor atmosphere.

Advantageous Effect of the Invention

Silicone particles hydrophilized according to the invention may be readily dispersed in aqueous materials without a need for dispersants, typically surfactants. In aqueous cosmetic applications externally applied to the skin such as skin care cosmetics, make-up cosmetics, antiperspirant cosmetics, and UV care cosmetics, for example, products free of skin irritation concern can be formulated because formulation is possible without a need for surfactants. In aqueous paints and inks, it is unnecessary to further add a surfactant for dispersing the silicone particles thereinto, thereby solving the problems that water resistance of the coating is lowered and bubbles are not easily disappeared.

EMBODIMENT FOR CARRYING OUT THE INVENTION

In one embodiment of the invention, hydrophilized silicone particles are obtained by treating surfaces of hydrophobic silicone particle with a plasma to be hydrophilic.

As used herein, the hydrophilized silicone particles refer to those particles which when added to water, are all uniformly dispersed in water rather than being kept afloat. It is believed that the particles exhibit such nature because surfaces of all particles in part or entirety have a contact angle with water of less than 90°.

Preferably the hydrophilized silicone particles lose their hydrophilicity with the lapse of time. Specifically, it is preferred that after silicone particles are hydrophilized by plasma treatment, the hydrophilized silicone particles lose hydrophilicity within several hours or several tens of days, for example, upon exposure to air at room temperature (25° C.) for 24 hours, to such an extent that when added to water, the particles are kept afloat, but not dispersed in water. Those hydrophilized silicone particles which become water repellent with the lapse of time are acceptable as long as they maintain hydrophilicity at the time of formulation in an aqueous material. They do not lose hydrophilicity while they are dispersed in water or kept wet. When water is volatilized from the aqueous dispersion of the hydrophilized silicone particles, the hydrophilic nature of the silicone particles is disappeared and the silicone particles turn hydrophobic. Because of such nature, the particles are regarded useful as a water repellent for aqueous cosmetics.

Although the size of the hydrophilized silicone particles and hydrophobic silicone particles to be hydrophilized is not particularly limited, they preferably have a volume average particle size in the range of 0.1 to 100 μm, more preferably 0.5 to 40 μm. If hydrophobic silicone particles have a size of less than 0.1 μm, they tend to agglomerate together and interfere with uniform plasma treatment of particle surfaces or plasma treatment of all particles, leading to difficulty in obtaining hydrophilized silicone particles. If the hydrophilized silicone particles have a volume average particle size in excess of 100 μm, in the cosmetic application, for example, silky feel and smoothness are degraded, and a granular feel is produced. Notably, the volume average particle size is measured by a laser diffraction/scattering particle size measuring instrument.

The shape of the hydrophilized silicone particles is not particularly limited. Examples include spherical shape, spindle shape, flat shape, shape with raised portions on surface, shape with recesses on surface, irregular shape, a chain of two or more particles, and an agglomerate of two or more particles, to name a few. The shape of particles may be identified by observing particles under an electron microscope.

For the hydrophilized silicone particles, the type of silicone particles to be hydrophilized is not particularly limited. Included are silicone rubber particles, polyorganosilsesquioxane particles, and silicone rubber particles surface coated with polyorganosilsesquioxane. Of these, the polyorganosilsesquioxane particles or silicone rubber particles surface coated with polyorganosilsesquioxane are preferred because they are less agglomerative and facilitate uniform plasma treatment of particle surfaces or plasma treatment of all particles. Thus hydrophilized silicone particles are readily obtainable.

The polyorganosilsesquioxane particles are particles of a resinous solid comprising a three-dimensional crosslinked network of units of the formula: $R^1SiO_{3/2}$ and having a melting point of at least 80° C. or not having a melting point. The polymer may be prepared by the method to be described later, via hydrolytic condensation reaction of a compound selected from alkoxysilanes, silanol-containing silanes, and partial condensates thereof. Since some silanol groups are left without undergoing condensation reaction, exactly stated, it is a copolymer further comprising silanol-containing structural units represented by the formula: $R^1Si(OH)O_{2/2}$.

In the formulas, $R^1$ stands for a substituted or unsubstituted monovalent hydrocarbon group of 1 to 20 carbon atoms. Examples of $R^1$ include alkyl groups such as methyl, ethyl, propyl, butyl, pentyl, hexyl, heptyl, octyl, decyl, undecyl, dodecyl, tetradecyl, pentadecyl, hexadecyl, heptadecyl, octadecyl, nonadecyl, and eicosyl; alkenyl groups such as vinyl and allyl; aryl groups such as phenyl, tolyl and naphthyl; aralkyl groups such as benzyl and phenethyl; cycloalkyl groups such as cyclopentyl, cyclohexyl and cycloheptyl; and substituted forms of the foregoing hydrocarbon groups in which some or all hydrogen atoms bonded to carbon atoms are substituted by atoms such as halogen (e.g., fluorine, chlorine, bromine and iodine) and/or substituents such as amino, acryloyloxy, methacryloyloxy, epoxy, glycidoxy, mercapto and carboxyl. When spherical particles are prepared by the method to be described later, for example, it is preferred that methyl, vinyl, phenyl, acryloyloxyalkyl or fluoroalkyl account for at least 50 mol %, more preferably at least 80 mol %, and even more preferably at least 90 mol % of $R^1$.

The polyorganosilsesquioxane may comprise at least one of $R^1{}_2SiO_{2/2}$ units, $R^1{}_3SiO_{1/2}$ units and $SiO_{4/2}$ units in addition to the $R^1SiO_{3/2}$ units as long as the additional units do not adversely affect non-agglomeration of particles and the feel on use such as silky feel and smoothness. In such polyorganosilsesquioxane, the content of $R^1SiO_{3/2}$ units is preferably 40 to 100 mol %, more preferably 80 to 100 mol % of the entire siloxane units.

The polyorganosilsesquioxane particles may be prepared by any well-known methods. For example, particles are prepared by adding, with stirring, a silane selected from among methyltrimethoxysilane, methyltriethoxysilane, and a mixture thereof to water containing a water-soluble alkali (JP-B S40-16917); by effecting hydrolysis/condensation reaction of methyltrialkoxysilane and/or partial hydrolytic condensate thereof at the interface between an upper layer of methyltrialkoxysilane and/or a partial hydrolytic condensate thereof and a lower layer of an aqueous solution of ammonia or amine (JP-A S63-77940); or by agitating methyltrialkoxysilane and/or partial hydrolytic condensate thereof and water until uniform, and adding an alkali to the uniform solution (JP-A H04-88023).

The silicone rubber particles surface coated with polyorganosilsesquioxane preferably consist of 100 parts by weight of silicone rubber particles coated with 0.5 to 25 parts by weight, more preferably 1 to 15 parts by weight of polyorganosilsesquioxane. Understandably, the polyorganosilsesquioxane used herein has the same chemistry as the above-mentioned polyorganosilsesquioxane particles.

The silicone rubber particles coated with polyorganosilsesquioxane are particles of a non-sticky cured substance comprising linear organosiloxane blocks of the formula: $-(R^2{}_2SiO_{2/2})_n-$ and having rubbery elasticity. In the formula, $R^2$ is a substituted or unsubstituted monovalent hydrocarbon group of 1 to 30 carbon atoms and n is a positive number of 5 to 5,000. Examples of $R^2$ include alkyl groups such as methyl, ethyl, propyl, butyl, pentyl, hexyl, heptyl, octyl, decyl, undecyl, dodecyl, tetradecyl, pentadecyl, hexadecyl, heptadecyl, octadecyl, nonadecyl, eicosyl, heneicosyl, docosyl, tricosyl, tetracosyl, and triacontyl; aryl groups such as phenyl, tolyl and naphthyl; aralkyl groups such as benzyl and phenethyl; alkenyl groups such as vinyl and allyl; cycloalkyl groups such as cyclopentyl, cyclohexyl and cycloheptyl; and substituted forms of the foregoing hydrocarbon groups in which some or all hydrogen atoms bonded to carbon atoms are substituted by atoms such as halogen (e.g., fluorine, chlorine, bromine and iodine) and/or substituents such as acryloyloxy, methacryloyloxy, epoxy, glycidoxy, and carboxyl.

The silicone rubber should preferably have a rubber hardness of 5 to 90 as measured by Type A Durometer according to JIS K-6253. A hardness of less than 5 may lead to more agglomeration and a lack of flow, dispersion, silky feel and smoothness whereas a hardness exceeding 90 may lead to a lack of soft feel. A hardness in the range of 10 to 80 is more preferable.

The silicone rubber particles surface coated with polyorganosilsesquioxane may be prepared by any well-known method of forming composite particles by coating surfaces of particles with another material. For example, the method of JP-A H07-196815 is preferred. Specifically, the method is by dispersing silicone rubber spherical particles in water, adding an alkaline substance or alkaline aqueous solution and an organotrialkoxysilane to the dispersion, and effecting hydrolytic condensation reaction.

The hydrophilized silicone particles are obtained by subjecting surfaces of hydrophobic silicone particles to plasma treatment to render them hydrophilic. In terms of treating conditions, the plasma treatment is divided into 1) low-pressure oxygen plasma treatment, 2) atmospheric plasma treatment, and 3) plasma polymerization treatment. Preferably, the hydrophilized silicone particles are prepared using any one of these treatments.

1) Low-Pressure Oxygen Plasma Treatment

Specifically, plasma treatment in an oxygen-containing gas atmosphere is carried out by feeding hydrophobic silicone particles in a plasma-generating chamber and then pumping the chamber to vacuum to bring the ultimate pressure below a certain level. When the chamber is charged with silicone particles and vacuum pumped, not only the adsorbed gas on the chamber surface, occluded gas in the chamber, and outgassing from the seal, but also the gas and moisture adsorbed to the silicone particles to be treated are released. It is then preferred from the practical and commercial aspects that the ultimate pressure of the chamber be kept constant prior to plasma treatment, because this setting leads to a reduced variation of quality between lots and within a common lot. The ultimate pressure by vacuum pumping is preferably equal to or less than 5 Pa, more preferably equal to or less than 2 Pa. A pressure equal to or less than 5 Pa is preferred because it is effective for reducing the variation of quality between lots and within a common lot caused by the adsorbed gas on the chamber surface, adsorbed gas on silicone particles and the like. To pump the chamber to the predetermined degree of vacuum, a vacuum pump having a capability of pumping to the desired degree of vacuum may be used. A commonly known pump such as oil-sealed rotary pump or dry pump may be used. The gauge used for measuring the degree of vacuum in the chamber may be any vacuum gauge capable of measuring a pressure in a predetermined range, for example, a diaphragm gauge or Pirani gauge.

When the oxygen-containing gas is fed into the chamber, a rare gas such as argon may be separately fed to form a gas mixture in the chamber. Preferably plasma treatment is carried out while continuously feeding the gas to the chamber and operating the vacuum pump so as to maintain the pressure in the chamber constant. The flow rate of the oxygen-containing gas fed to the chamber is preferably 1.5 to 200 ml/min, more preferably 2 to 100 ml/min, when the chamber has an internal volume of the order of 150 to 700 L, for example.

Plasma treatment is preferably performed after the gas is fed into the chamber and the pressure in the chamber is stabilized. The treating conditions during electric discharge may be selected as appropriate, for example, a chamber pressure of 30 to 100 Pa, a discharge power of 10 to 80 W, and a power supply for plasma creation having a low frequency of 6 to 15 kHz. The plasma system may include internal and external electrode types. A well-known plasma system of either type may be used to perform plasma treatment. The time for low-pressure oxygen plasma treatment may be determined as appropriate insofar as the surface is fully hydrophilized, with a treatment time of at least 1 hour being preferred.

Surfaces of particles subjected to plasma treatment should preferably be kept in uniform contact with the plasma. To this end, particles must be positively moved during treatment. The preferred means is by rotating a reactor filled with particles or by allowing particles to fall down through the plasma chamber where they are treated. These treatment procedures are often batchwise. In case of high throughputs, the above-mentioned procedure may be performed in a continuous mode.

Immediately after the treatment, the particles are taken out, optionally exposed to a water vapor atmosphere, and admitted into water to form a dispersion. Preferably a suitable agitator may be used to break secondary agglomeration of particles, for example, a high-speed rotation centrifugal radial agitator such as Homo Disper, high-speed rotation shear agitator such as Homo Mixer, high-pressure injection disperser such as Gaulin Homogenizer or Micro-Fluidizer, forced infiltration disperser such as colloid mill, media agitating mill such as bead mill, and ultrasonic disperser.

Through the foregoing steps, surfaces of silicone particles can be given a hydrophilic property necessary to disperse in water.

2) Atmospheric Plasma Treatment

Atmospheric plasma treatment may be carried out by providing a rare gas such as argon, helium, krypton, neon, xenon or nitrogen or a mixture of two or more rare gases, conducting an alternating current at 3 to 5 kHz and 2 to 3,000 V between electrodes, electronically exciting the rare gas with the plasma jet, removing charged particles to render the excited rare gas electrically neutral, and contacting silicone particles with the excited rare gas. The time for atmospheric plasma treatment is preferably 1 to 60 minutes, more preferably 1 to 10 minutes. The rare gas is preferably argon, and a gas mixture of argon with an oxygen-containing gas such as oxygen, water vapor or hydrogen peroxide is also acceptable.

Preferably the particles are dispersed in the treatment chamber by the stream of plasma jet, whereby their surfaces are uniformly treated. These treatment procedures are often batchwise. In case of high throughputs, the above-mentioned procedure may be performed in a continuous mode.

Immediately after the treatment, the particles are taken out, optionally exposed to a water vapor atmosphere, and admitted into water to form a dispersion. Preferably a suitable agitator may be used to break secondary agglomeration of particles, for example, a high-speed rotation centrifugal radial agitator such as Homo Disper, high-speed rotation shear agitator such as Homo Mixer, high-pressure injection disperser such as Gaulin Homogenizer or Micro- Fluidizer, forced infiltration disperser such as colloid mill, media agitating mill such as bead mill, and ultrasonic disperser.

Through the foregoing steps, surfaces of silicone particles can be given a hydrophilic property necessary to disperse in water.

3) Plasma Polymerization Treatment

Plasma polymerization treatment is carried out in a gas mixture atmosphere of hydrocarbon gas and an oxygen-containing gas, preferably a gas mixture of methane and oxygen. Specifically, plasma polymerization treatment in a gas mixture atmosphere of hydrocarbon gas and an oxygen-containing gas, typically methane and oxygen is carried out by feeding silicone particles into a plasma polymerization reactor and then pumping the reactor to vacuum to bring the ultimate pressure below a certain level. When the reactor is charged with silicone particles and vacuum pumped, not only the adsorbed gas on the reactor surface, occluded gas in the reactor, and outgassing from the seal, but also the gas and moisture adsorbed to the silicone particles to be treated are released. It is then preferred from the practical and commercial aspects that the ultimate pressure of the reactor be kept constant prior to plasma polymerization treatment, because this setting leads to a reduction of the variation of quality (specifically the variation of coating film thickness) between lots and within a common lot. The ultimate pressure by vacuum pumping is preferably equal to or less than 0.5 Pa, more preferably equal to or less than 0.2 Pa. A pressure equal to or less than 0.5 Pa is preferred because it is effective for reducing the variation of quality between lots and within a common lot caused by the adsorbed gas on the reactor surface, adsorbed gas on silicone particles and the like. To pump the reactor below the predetermined degree of vacuum, a vacuum pump having a capability of pumping to the desired degree of vacuum may be used. A commonly known pump such as oil-sealed rotary pump or dry pump may be used. The gauge used for measuring the degree of vacuum in the reactor may be any vacuum gauge capable of measuring a pressure in a predetermined range, for example, a diaphragm gauge or Pirani gauge.

In the plasma polymerization treatment, the mixing ratio of hydrocarbon gas to oxygen-containing gas, typically the mixing ratio of methane to oxygen is preferably from 50:50 to 70:30 on a volume basis. A ratio of the oxygen-containing gas exceeding the range is undesirable because of a reduced rate of deposition of a coating on the silicone particle surface (or an extended treatment time) and a lowering of water wettability. A ratio of the hydrocarbon gas, typically methane, exceeding the range is also undesirable from the process aspect because of a likelihood of carbon depositing in the reactor. More preferably the mixing ratio is from 55:45 to 65:35.

A gas mixture of hydrocarbon gas such as methane and oxygen-containing gas such as oxygen may be fed into the reactor. Alternatively, hydrocarbon gas such as methane and oxygen-containing gas such as dry oxygen (moisture content: less than 3 ppm) may be separately fed into the reactor to form a gas mixture therein. In this case, preferably plasma polymerization treatment is carried out while continuously feeding the gases to the reactor and operating the vacuum pump so as to maintain the reactor pressure constant. The flow rate of the gas mixture of hydrocarbon gas such as methane and oxygen-containing gas such as oxygen fed to the reactor is preferably 1.5 to 20 ml/min, more preferably 2 to 10 ml/min, when the reactor has an internal volume of the order of 150 to 700 L, for example.

Plasma polymerization treatment is preferably performed after the gases are fed into the reactor and the pressure in the reactor is stabilized. The treating conditions during electric discharge may be selected as appropriate, for example, a reactor pressure of 3 to 10 Pa, a discharge power of 10 to 80 W, and a power supply for plasma creation having a low frequency of 6 to 15 kHz. The plasma system may include internal and external electrode types. A well-known plasma system of either type may be used to perform plasma polymerization treatment. The time for plasma polymerization treatment in the first step may be determined by taking into account the desired coating thickness. For example, the treatment time may be in a range of 3 to 20 minutes, preferably 4 to 10 minutes.

Surfaces of particles subjected to plasma treatment should preferably be kept in uniform contact with the plasma. To this end, particles must be positively moved during treatment. The preferred means is by rotating the reactor filled with particles or by allowing particles to fall down through the plasma reactor where they are treated. These treatment procedures are often batchwise. In case of high throughputs, the above-mentioned procedure may be performed in a continuous mode.

Immediately after the treatment, the particles are taken out, optionally exposed to a water vapor atmosphere, and admitted into water to form a dispersion. Preferably a suitable agitator may be used to break secondary agglomeration of particles, for example, a high-speed rotation centrifugal radial agitator such as Homo Disper, high-speed rotation shear agitator such as Homo Mixer, high-pressure injection disperser such as Gaulin Homogenizer or Micro-Fluidizer, forced infiltration disperser such as colloid mill, media agitating mill such as bead mill, and ultrasonic disperser.

Through the foregoing steps, surfaces of silicone particles can be given a hydrophilic property necessary to disperse in water.

EXAMPLES

Examples and Comparative Examples are given below by way of illustration, but the invention is not limited thereto.

[Evaluation of Hydrophilicity]

To 100 g of water in a 100-ml glass beaker was added 1 g of silicone particles. After stirring for 10 seconds with a glass bar, a dispersed state of silicone particles was observed. Silicone particles were judged hydrophilic when all particles were dispersed in water without being kept afloat.

Example 1

A glass flask (volume 5 L) equipped with an agitator having an anchor paddle was charged with 4,250 g of deionized water and 100 g of 28 wt % aqueous ammonia, which was kept at 20° C. The liquid was at pH 11.5. With stirring at a paddle revolution speed of 150 rpm, 650 g of methyltrimethoxysilane was added dropwise over 140 minutes to the liquid, which was kept at 15-25° C. After the completion of dropwise addition, the liquid was stirred for 1 hour at 15-25° C., then heated at 75-80° C., and stirred for a further 4 hours. Using a pressure filter, the resulting slurry was deliquored into a cake. The cake was dried in a hot air circulating dryer at a temperature of 105° C. The dry cake was disintegrated on a jet mill, yielding polymethylsilsesquioxane particles, designated Silicone Particles #1.

Silicone Particles #1, 20 g, was placed in a rotary reduced-pressure glass reactor (reactor vessel volume 500 ml), which was pumped to a vacuum of about 0.1 Pa and held vacuum for about 10 minutes. Then oxygen was continuously fed to the reactor, from which oxygen was removed by a vacuum pump so as to establish a pressure of 50 Pa. After the pressure within the reactor was stabilized, a load of 60 W was applied to electrodes installed outside the reactor to create a plasma. Low-pressure oxygen plasma treatment was continued for 3 hours.

Immediately after the completion of plasma treatment, the silicone particles were taken out and evaluated for hydrophilicity by the above method. All particles dispersed in water.

Then, 18 g of the plasma-treated hydrophilic silicone particles was added to 72 g of water in a 150 ml-beaker and agitation was conducted by using a homomixer to obtain a water dispersion of the silicone particles.

By using the water dispersion, Plasma-treated Silicone Particles #1 was measured for particle size by LA-920 (laser diffraction/scattering particle size analyzer, Horiba, Ltd., trade name), finding an average particle size of 2.1 μm. When observed under an electron microscope, the particles were of spherical shape.

Then, 6 g of the water dispersion of the plasma-treated hydrophilic silicone particles taken in a laboratory aluminum dish to dry the silicone particles at room temperature for 24 hours. The dried silicone particles were evaluated for hydrophilicity by the above method. The dried particles did not disperse in water any longer, but were all kept a float.

Example 2

Silicone Particles #1 obtained in Example 1, 5 g, was placed in a glass reactor (cylindrical vessel reactor, 1 L) which was provided at the bottom with a plasma jet nozzle. The plasma jet nozzle was directed to the interior of the reactor, whereupon a plasma of saturated steam on argon gas carrier was applied to the powder at a rate of 10 L/min. This treatment was continued for about 15 minutes while keeping the powder in uniformly suspended state.

Immediately after the completion of plasma treatment, the silicone particles were taken out and evaluated for hydrophilicity by the above method. All particles dispersed in water.

Then, 18 g of the plasma-treated hydrophilic silicone particles was added to 72 g of water in a 150 ml-beaker and agitation was conducted by using a homomixer to obtain a water dispersion of the silicone particles.

By using the water dispersion, Plasma-treated Silicone Particles #1 was measured for particle size by analyzer LA-920, finding an average particle size of 2.3 μm. When observed under an electron microscope, the particles were of spherical shape.

Then, 6 g of the water dispersion of the plasma-treated hydrophilic silicone particles taken in a laboratory aluminum dish to dry the silicone particles at room temperature for 24 hours. The dried silicone particles were evaluated for hydrophilicity by the above method. The dried particles did not disperse in water any longer, but were all kept a float.

Example 3

Silicone Particles #1 obtained in Example 1, 20 g, was placed in a rotary reduced-pressure glass reactor (reactor vessel volume 500 ml), which was pumped to a vacuum of about 0.1 Pa and held vacuum for about 10 minutes. Then reactive gas (gas mixture of methane and oxygen in a ratio of 2/1 on a volume basis) was continuously fed to the reactor, from which the gas was removed by a vacuum pump so as to establish a pressure of 5 Pa. After the pressure within the reactor was stabilized, a load of 60 W was applied to electrodes installed outside the reactor to create a plasma. Plasma treatment was continued for 15 minutes.

Immediately after the completion of plasma treatment, the silicone particles were taken out and evaluated for hydrophilicity by the above method. All particles dispersed in water.

Then, 18 g of the plasma-treated hydrophilic silicone particles was added to 72 g of water in a 150 ml-beaker and agitation was conducted by using a homomixer to obtain a water dispersion of the silicone particles.

By using the water dispersion, Plasma-treated Silicone Particles #1 was measured for particle size by analyzer LA-920, finding an average particle size of 2.5 μm. When observed under an electron microscope, the particles were of spherical shape.

Then, 6 g of the water dispersion of the plasma-treated hydrophilic silicone particles taken in a laboratory aluminum dish to dry the silicone particles at room temperature for 24 hours. The dried silicone particles were evaluated for hydrophilicity by the above method. The dried particles did not disperse in water any longer, but were all kept a float.

Example 4

A glass beaker (volume 1 L) was charged with 500 g of methylvinylpolysiloxane of the following formula (1) having a viscosity of 590 mm$^2$/s and 19 g (an amount to provide 1.06 hydrosilyl groups per vinyl group) of methylhydrogenpolysiloxane of the following formula (2) having a viscosity of 30 mm$^2$/s, which were stirred for dissolution by Homo Mixer at 2,000 rpm. Then 3 g of polyoxyethylene lauryl ether (ethylene oxide added=9 moles) and 55 g of water were added to the solution. With stirring by Homo Mixer at 6,000 rpm, this became an oil-in-water type emulsion, with a viscosity buildup acknowledged. Stirring was continued for 15 minutes. With stirring at 2,000 rpm, 421 g of water was then added to the emulsion, which became a uniform white emulsion. The emulsion was transferred to a glass flask (volume 1 L) equipped with an agitator having an anchor paddle. After the flask was conditioned to a temperature of 15-20° C., with stirring, a mixed solution of 0.8 g of a toluene solution of chloroplatinic acid-olefin complex (platinum content 0.5 wt %) and 1.6 g of polyoxyethylene lauryl ether (ethylene oxide added=9 moles) was added. The contents were stirred at the temperature for 12 hours, yielding a water dispersion of silicone rubber particles.

Separately, methylvinylpolysiloxane of the following formula (1) having a viscosity of 590 mm$^2$/s, methylhydrogenpolysiloxane of the following formula (2) having a viscosity of 30 mm$^2$/s, and a toluene solution of chloroplatinic acid-olefin complex (platinum content 0.5 wt %) were mixed in the same amounts as above and cast into an aluminum dish to a thickness of 10 mm. This was held at 25° C. for 24 hours, after which it was heated in a thermostat tank at 50° C. for 1 hour, yielding a non-sticky silicone rubber. The silicone rubber had a hardness of 29 as measured by Durometer A hardness meter.

A water dispersion of the resulting silicone rubber particles, 870 g, was transferred to a glass flask (volume 3 L) equipped with an agitator having an anchor paddle, to which 2,013 g of water and 57 g of 28 wt % aqueous ammonia were added. The liquid was at pH 11.3. After the flask was conditioned to a temperature of 5-10° C., 60 g (an amount to produce 6.5 parts by weight of polymethylsilsesquioxane per 100 parts by weight of silicone rubber particles at the end of hydrolytic condensation reaction) of methyltrimethoxysilane was added dropwise over 20 minutes to the liquid, which was kept at 5-10° C. Thereafter, the liquid was stirred for 1 hour at 5-10° C., then heated at 55-60° C., and stirred for 1 hour at the temperature, completing hydrolytic condensation reaction of methyltrimethoxysilane.

Using a pressure filter, the resulting slurry was deliquored into a cake. The cake was transferred to a glass flask (volume 5 L) equipped with an agitator having an anchor paddle, to which 3,000 g of 50 wt % methanol water was added, followed by stirring for 30 minutes. Using a pressure filter, the slurry was deliquored into a cake. The cake was transferred to a glass flask (volume 5 L) equipped with an agitator having an anchor paddle, to which 3,000 g of water was added, followed by stirring for 30 minutes. Using a pressure filter, the slurry was deliquored into a cake. The cake was dried in a hot air circulating dryer at a temperature of 105° C. The dry cake was disintegrated on a jet mill, yielding silicone rubber particles surface coated with polyorganosilsesquioxane, designated Silicone Particles #2.

When observed under an electron microscope, Silicone Particles #2 were spherical particles surface covered with grains of about 100 nm, indicating that spherical fine particles of silicone rubber were coated with polymethylsilsesquioxane.

Silicone Particles #2, 20 g, was placed in a rotary reduced-pressure glass reactor (reactor vessel volume 500 ml), which was pumped to a vacuum of about 0.1 Pa and held vacuum for about 10 minutes. Then oxygen was continuously fed to the reactor, from which oxygen was removed by a vacuum pump so as to establish a pressure of 50 Pa. After the pressure within the reactor was stabilized, a load of 60 W was applied to electrodes installed outside the reactor to create a plasma. Low-pressure oxygen plasma treatment was continued for 3 hours.

Immediately after the completion of plasma treatment, the silicone particles were taken out and evaluated for hydrophilicity by the above method. All particles dispersed in water.

Then, 18 g of the plasma-treated hydrophilic silicone particles was added to 72 g of water in a 150 ml-beaker and agitation was conducted by using a homomixer to obtain a water dispersion of the silicone particles.

By using the water dispersion, Plasma-treated Silicone Particles #2 was measured for particle size by analyzer LA-920, finding an average particle size of 5.8 μm.

Then, 6 g of the water dispersion of the plasma-treated hydrophilic silicone particles taken in a laboratory aluminum dish to dry the silicone particles at room temperature for 24 hours. The dried silicone particles were evaluated for hydrophilicity by the above method. The dried particles did not disperse in water any longer, but were all kept a float.

[Chemical formula 1]

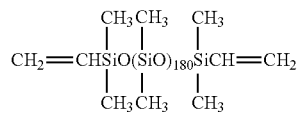

(1)

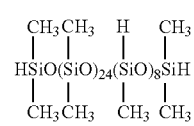

Example 5

Silicone Particles #2 obtained in Example 4, 5 g, was placed in a glass reactor (cylindrical vessel reactor, 1 L) which was provided at the bottom with a plasma jet nozzle. The plasma jet nozzle was directed to the interior of the reactor, whereupon a plasma of saturated steam on argon gas carrier was applied to the powder at a rate of 10 L/min. This treatment was continued for about 15 minutes while keeping the powder in uniformly suspended state.

Immediately after the completion of plasma treatment, the silicone particles were taken out and evaluated for hydrophilicity by the above method. All particles dispersed in water.

Then, 18 g of the plasma-treated hydrophilic silicone particles was added to 72 g of water in a 150 ml-beaker and agitation was conducted by using a homomixer to obtain a water dispersion of the silicone particles.

By using the water dispersion, Plasma-treated Silicone Particles #2 was measured for particle size by analyzer LA-920, finding an average particle size of 5.5 μm.

Then, 6 g of the water dispersion of the plasma-treated hydrophilic silicone particles taken in a laboratory aluminum dish to dry the silicone particles at room temperature for 24 hours. The dried silicone particles were evaluated for hydrophilicity by the above method. The dried particles did not disperse in water any longer, but were all kept a float.

Example 6

Silicone Particles #2 obtained in Example 4, 20 g, was placed in a rotary reduced-pressure glass reactor (reactor vessel volume 500 ml), which was pumped to a vacuum of about 0.1 Pa and held vacuum for about 10 minutes. Then reactive gas (gas mixture of methane and oxygen in a ratio of 2/1 on a volume basis) was continuously fed to the reactor, from which the gas was removed by a vacuum pump so as to establish a pressure of 5 Pa. After the pressure within the reactor was stabilized, a load of 60 W was applied to electrodes installed outside the reactor to create a plasma. Plasma treatment was continued for 15 minutes.

Immediately after the completion of plasma treatment, the silicone particles were taken out and evaluated for hydrophilicity by the above method. All particles dispersed in water.

Then, 18 g of the plasma-treated hydrophilic silicone particles was added to 72 g of water in a 150 ml-beaker and agitation was conducted by using a homomixer to obtain a water dispersion of the silicone particles.

By using the water dispersion, Plasma-treated Silicone Particles #2 was measured for particle size by analyzer LA-920, finding an average particle size of 6.2 μm.

Then, 6 g of the water dispersion of the plasma-treated hydrophilic silicone particles taken in a laboratory aluminum dish to dry the silicone particles at room temperature for 24 hours. The dried silicone particles were evaluated for hydrophilicity by the above method. The dried particles did not disperse in water any longer, but were all kept a float.

When the hydrophilic silicone particles after plasma treatment obtained in Examples 1 to 6 were exposed to air at room temperature (25° C.) for 24 hours, the silicone particles of each Example turned hydrophobic and were all kept afloat in the test.

Comparative Example 1

Silicone Particles #1 (prior to plasma treatment) obtained in Example 1 was dispersed in a polyoxyethylene lauryl ether aqueous solution and measured for particle size by analyzer LA-920, finding an average particle size of 1.9 µm. When observed under an electron microscope, the particles were of spherical shape.

Silicone particles #1 was evaluated for hydrophilicity by the above method. The particles did not disperse in water, but were all kept afloat.

Comparative Example 2

Silicone Particles #2 (prior to plasma treatment) obtained in Example 4 was dispersed in a polyoxyethylene lauryl ether aqueous solution and measured for particle size by analyzer LA-920, finding an average particle size of 5.3 µm.

Silicone particles #2 was evaluated for hydrophilicity by the above method. The particles did not disperse in water, but were all kept afloat.

The invention claimed is:

1. A uniform water dispersion of silicone particles made hydrophilic at their surfaces by plasma treatment; wherein the particles are not re-dispersible in water after the water has been removed from said dispersion.

2. The water dispersion of silicone particles of claim 1 wherein silicone particles to by hydrophilized are polyorganosilsesquioxane particles or silicone rubber particles surface coated with polyorganosilsesquioxane.

3. A method for preparing hydrophilic silicone particles comprising plasma treating surfaces of hydrophobic silicone particles, wherein surfaces of hydrophobic silicone particles are hydrophilized by subjecting them to plasma polymerization treatment using a hydrocarbon gas, an oxygen-containing gas and optionally, a rare gas.

4. The method of claim 3 wherein the hydrophobic silicone particles are fed into a plasma polymerization reactor, the reactor is pumped to a pressure equal to or less than 0.5 Pa, a hydrocarbon gas, an oxygen-containing gas and optionally, a rare gas are fed into the reactor, and plasma polymerization treatment is effected under a pressure of 3 to 10 Pa.

5. The method of claim 3 wherein the hydrophobic silicone particles are polyorganosilsesquioxane particles or silicone rubber particles surface coated with polyorganosilsesquioxane.

6. The method of claim 3 wherein the silicone particles as plasma treated are optionally exposed to a water vapor atmosphere and admitted to and dispersed in water.

7. The method of claim 4 wherein the silicone particles as plasma treated are optionally exposed to a water vapor atmosphere and admitted to and dispersed in water.

8. The method of claim 5 wherein the silicone particles as plasma treated are optionally exposed to a water vapor atmosphere and admitted to and dispersed in water.

9. A cosmetic composition comprising a uniform water dispersion of silicone particles made hydrophilic at their surfaces by plasma treatment; wherein the particles are not re-dispersible in water after the water has been removed from said dispersion.

* * * * *